(12) United States Patent
Parham

(10) Patent No.: US 8,910,482 B2
(45) Date of Patent: Dec. 16, 2014

(54) AIRCRAFT ENGINE NOZZLE

(75) Inventor: Dean Leon Parham, Issaquah, WA (US)

(73) Assignee: The Boeing Company, Chicago, IL (US)

(*) Notice: Subject to any disclaimer, the term of this patent is extended or adjusted under 35 U.S.C. 154(b) by 957 days.

(21) Appl. No.: 13/019,431

(22) Filed: Feb. 2, 2011

(65) Prior Publication Data

US 2012/0193441 A1 Aug. 2, 2012

(51) Int. Cl.
| | | |
|---|---|---|
| *F02K 1/00* | (2006.01) | |
| *F02K 3/02* | (2006.01) | |
| *B63H 11/10* | (2006.01) | |
| *F02K 1/54* | (2006.01) | |
| *F02K 1/72* | (2006.01) | |
| *F02K 1/76* | (2006.01) | |
| *F02K 1/34* | (2006.01) | |

(52) U.S. Cl.
CPC . *B64D 33/06* (2013.01); *F02K 1/72* (2013.01); *F02K 1/763* (2013.01); *Y02T 50/671* (2013.01)
USPC ..... 60/771; 60/226.2; 244/110 B; 239/265.19

(58) Field of Classification Search
CPC ........... F02K 1/1253; F02K 1/72; F02K 1/70; F02K 1/04; F02K 1/32; F02K 1/625; B64C 15/02
USPC ............ 60/771, 226.2, 228; 244/110 B; 239/265.19, 265.23, 265.25, 265.31
See application file for complete search history.

(56) References Cited

U.S. PATENT DOCUMENTS

| | | | |
|---|---|---|---|
| 126,174 A | | 4/1872 | Bidwell |
| 3,658,279 A | * | 4/1972 | Robertson .................... 244/53 R |
| 3,829,020 A | | 8/1974 | Stearns |
| 4,922,713 A | | 5/1990 | Barbarin et al. |
| 5,806,302 A | | 9/1998 | Cariola et al. |
| 6,751,944 B2 | | 6/2004 | Lair |
| 2003/0183723 A1 | * | 10/2003 | Bevilaqua ..................... 244/12.5 |
| 2008/0022690 A1 | * | 1/2008 | Chanez et al. .................. 60/770 |
| 2009/0288386 A1 | * | 11/2009 | Marshall et al. ................. 60/204 |
| 2010/0115958 A1 | | 5/2010 | Parham |
| 2011/0030338 A1 | * | 2/2011 | Vauchel ....................... 60/226.2 |

* cited by examiner

*Primary Examiner* — Gerald L Sung
(74) *Attorney, Agent, or Firm* — Yee & Associates, P.C.

(57) ABSTRACT

An apparatus and method comprising a fan nozzle sleeve, a plurality of slider mechanisms, and a fan nozzle actuator system. A flow of gases generated by an engine moves through and exits the engine at an aft end of the fan nozzle sleeve. The plurality of slider mechanisms is configured to connect the fan nozzle sleeve to a translating sleeve for a thrust reverser for the engine. The fan nozzle actuator system is configured to activate the plurality of slider mechanisms to move the fan nozzle sleeve in an aft direction to change a direction of the flow of gases exiting the engine at the aft end of the fan nozzle sleeve.

12 Claims, 13 Drawing Sheets

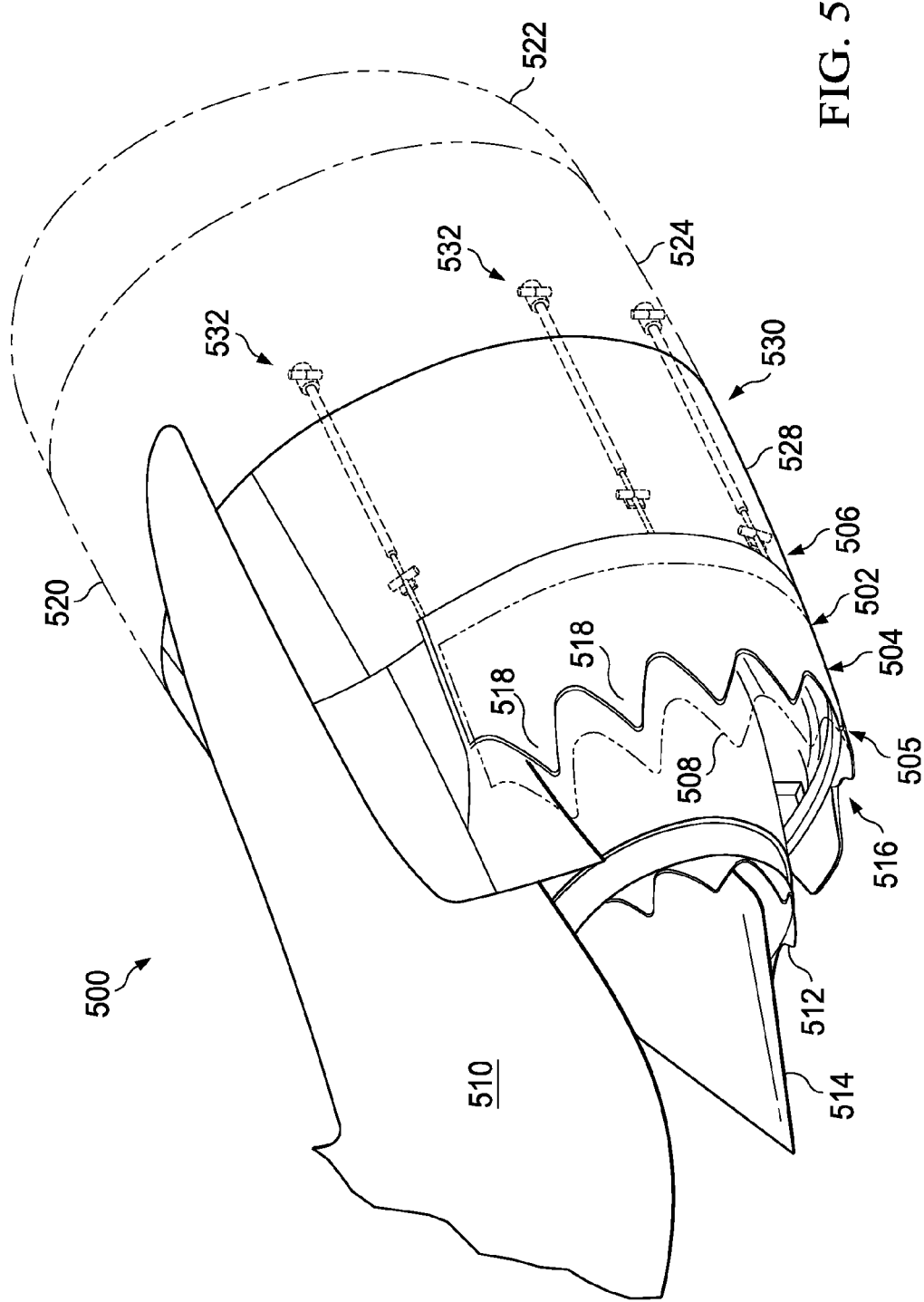

AIRCRAFT ENGINE NOZZLE

CROSS REFERENCE TO RELATED APPLICATION

The present disclosure is related to the following patent application entitled "Radially Translating Fan Nozzle Nacelle", Ser. No. 12/268,902, filed on Nov. 11, 2008, assigned to NovaTech IP Law, San Clemente, Calif., and incorporated herein by reference.

BACKGROUND INFORMATION

1. Field

The present disclosure relates generally to aircraft and, in particular, to aircraft engines. Still more particularly, the present disclosure relates to a method and apparatus for changing the direction of gases exiting a nozzle for an aircraft engine.

2. Background

Noise caused by aircraft near airports is a source of noise pollution. As an engine for a jet operates, the engine generates a flow of gases to move the aircraft. The flow of gases generated by the engine may also be referred to as a plume or exhaust for the engine. With respect to the noise caused by aircraft, the engine exhaust in aircraft makes up a large amount of the noise produced by the aircraft during takeoff.

A number of different mechanisms have been used to reduce the amount of noise. These mechanisms include altering the flow of the gases generated by the engine. The exit area of the fan nozzle may be increased during takeoff to reduce the noise from the exhaust.

One mechanism includes moving the nozzle of the engine in a linear direction towards the aft of the aircraft. This movement of the nozzle is parallel to a longitudinal axis of the engine. This type of movement of the nozzle may increase the exit area of the nozzle and reduce the speed of the exhaust. The reduction in the speed of the exhaust reduces the noise generated by the engine.

However, this type of mechanism may have a number of drawbacks. For example, by moving the nozzle in a direction towards the aft of the aircraft, an opening may be created. This opening may result in a leakage through the engine that reduces the thrust generated by the engine. As a result, the performance of the engine may be reduced. This reduction may reduce the fuel efficiency and increase the cost of operating the engine.

If seals are used to reduce leakage, maintenance of the seals is performed. This maintenance may increase how long an aircraft is out of service and increase the operating costs for the aircraft.

Further, this type of mechanism may involve a movement of the nozzle between a stowed and deployed position to provide a desired amount of noise reduction and a desired amount of thrust during takeoff. This type of movement may have clearance issues between the movement of the nozzle and control surfaces on the trailing edge of a wing of the aircraft.

Another approach currently used may include increasing the exit area by implementing flaps that expand. These flaps may be pivoted outward and reduce the exhaust velocity. These types of flaps may be biased to one side or the other side to provide the desired amount of thrust in the desired direction for maneuvering the aircraft. This type of mechanism, however, may increase the weight, maintenance, complexity, and cost of an aircraft engine.

Therefore, it would be desirable to have a method and apparatus that takes into account one or more of the issues discussed above, as well as possibly other issues.

SUMMARY

In one advantageous embodiment, an apparatus comprises a fan nozzle sleeve, a plurality of slider mechanisms, and a fan nozzle actuator system. A flow of gases generated by an engine moves through the engine and exits the engine at an aft end of the fan nozzle sleeve. The plurality of slider mechanisms is configured to connect the fan nozzle sleeve to a translating sleeve for a thrust reverser for the engine. The fan nozzle actuator system is configured to activate the plurality of slider mechanisms to move the fan nozzle sleeve in an aft direction and rotate the fan nozzle sleeve to change a direction of the flow of gases exiting the fan nozzle sleeve.

In another advantageous embodiment, a method is provided for changing a direction of a flow of gases for an engine of an aircraft. Monitoring for a signal to change the direction of the flow of gases for the engine of the aircraft is performed. The flow of gases generated by the engine moves through the engine and exits the engine at an aft end of a fan nozzle sleeve. The fan nozzle sleeve is moved using a plurality of slider mechanisms and a fan nozzle actuator system such that the direction of the flow of gases exiting the engine at the aft end of the fan nozzle sleeve changes.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 5 is an illustration of a perspective view of a high bypass turbofan gas turbine engine mounted on an aircraft in accordance with an advantageous embodiment;

DETAILED DESCRIPTION

Figure 1:
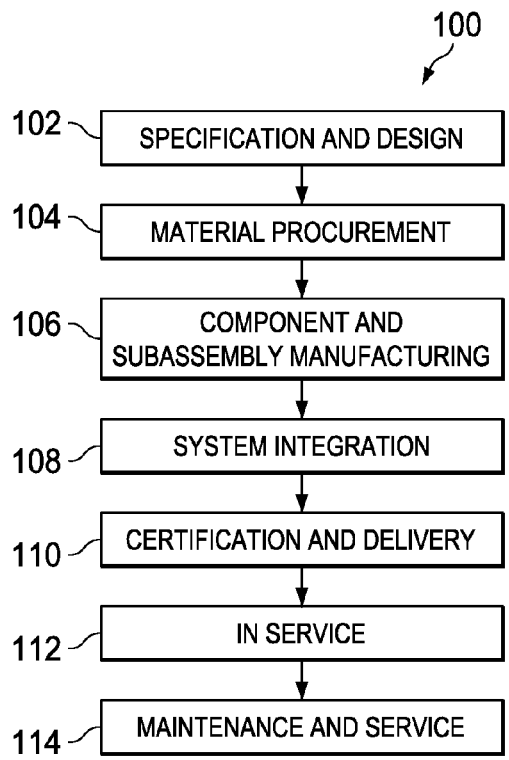
FIG. 1 is an illustration of an aircraft manufacturing and service method in accordance with an advantageous embodiment.
Figure 2:
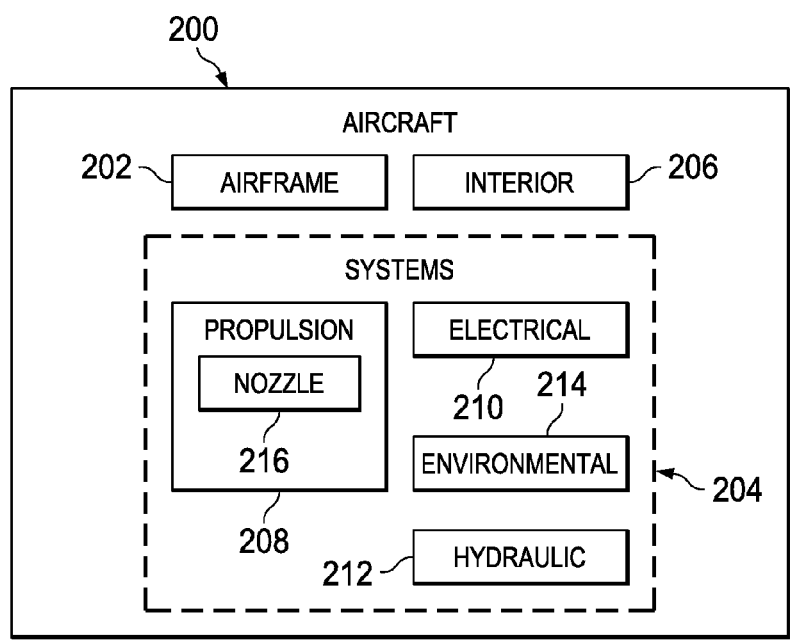
FIG. 2 is an illustration of an aircraft in which an advantageous embodiment may be implemented.

Referring more particularly to the drawings, embodiments of the disclosure may be described in the context of an aircraft manufacturing and service method 100 as shown in FIG. 1 and an aircraft 200 as shown in FIG. 2. Turning first to FIG. 1, an illustration of an aircraft manufacturing and service method is depicted in accordance with an advantageous embodiment. During pre-production, the aircraft manufacturing and service method 100 may include a specification and design 102 of the aircraft 200 in FIG. 2 and material procurement 104.

During production, component and subassembly manufacturing 106 and system integration 108 of the aircraft 200 in FIG. 2 takes place. Thereafter, the aircraft 200 in FIG. 2 may go through certification and delivery 110 in order to be placed in service 112. While the in service 112 by a customer, the aircraft 200 in FIG. 2 is scheduled for routine maintenance and service 114, which may include modification, reconfiguration, refurbishment, and other maintenance or service.

Each of the processes of the aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, the aircraft 200 is produced by the aircraft manufacturing and service method 100 in FIG. 1 and may include an airframe 202 with a plurality of systems 204 and an interior 206. Examples of the systems 204 include one or more of a propulsion system 208, an electrical system 210, a hydraulic system 212, an environmental system 214, and a nozzle system 216. Any number of other systems may be included.

The nozzle system 216 is included in the propulsion system 208 in these examples. The nozzle system 216 may be used to change the direction of a flow of gases from an engine in the propulsion system 208. Although an aerospace example is shown, different advantageous embodiments may be applied to other industries, such as the automotive industry.

Apparatus and methods embodied herein may be employed during at least one of the stages of the aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in the component and subassembly manufacturing 106 in FIG. 1 may be fabricated or manufactured in a manner similar to components or subassemblies produced while the aircraft 200 is in service 112 in FIG. 1. As yet another example, a number of apparatus embodiments, method embodiments, or a combination thereof may be utilized during production stages, such as the component and subassembly manufacturing 106 and the system integration 108 in FIG. 1. A number, when referring to items, means one or more items. For example, a number of apparatus embodiments is one or more apparatus embodiments. A number of apparatus embodiments, method embodiments, or a combination thereof may be utilized while the aircraft 200 is in service 112 and/or during the maintenance and service 114 in FIG. 1. The use of a number of the different advantageous embodiments may substantially expedite the assembly of and/or reduce the costs of the aircraft 200.

The different advantageous embodiments recognize and take into account a number of issues. For example, the different advantageous embodiments recognize and take into account that another solution may involve using a larger engine for the aircraft. The different advantageous embodiments recognize and take into account that some aircraft may have a limited amount of ground clearance. As a result, a larger engine may require a change in the landing gear to provide more clearance. Changing the size of the landing gear may increase the weight and/or complexity of the aircraft, which may be undesirable.

Thus, the different advantageous embodiments provide a method and apparatus for managing a direction of a flow of gases for an engine of an aircraft. In one advantageous embodiment, an apparatus comprises a fan nozzle sleeve, a plurality of slider mechanisms, and a fan nozzle actuator system. A flow of gases generated by an engine moves through the engine and exits the engine at an aft end of the fan nozzle sleeve. The plurality of slider mechanisms is configured to connect the fan nozzle sleeve to a translating sleeve of a thrust reverser for the engine. The fan nozzle actuator system is configured to activate the plurality of slider mechanisms to move the fan nozzle sleeve in an aft direction and rotate the fan nozzle sleeve to change the direction of the flow of gases exiting the engine at the aft end of the fan nozzle sleeve.

Figure 3:
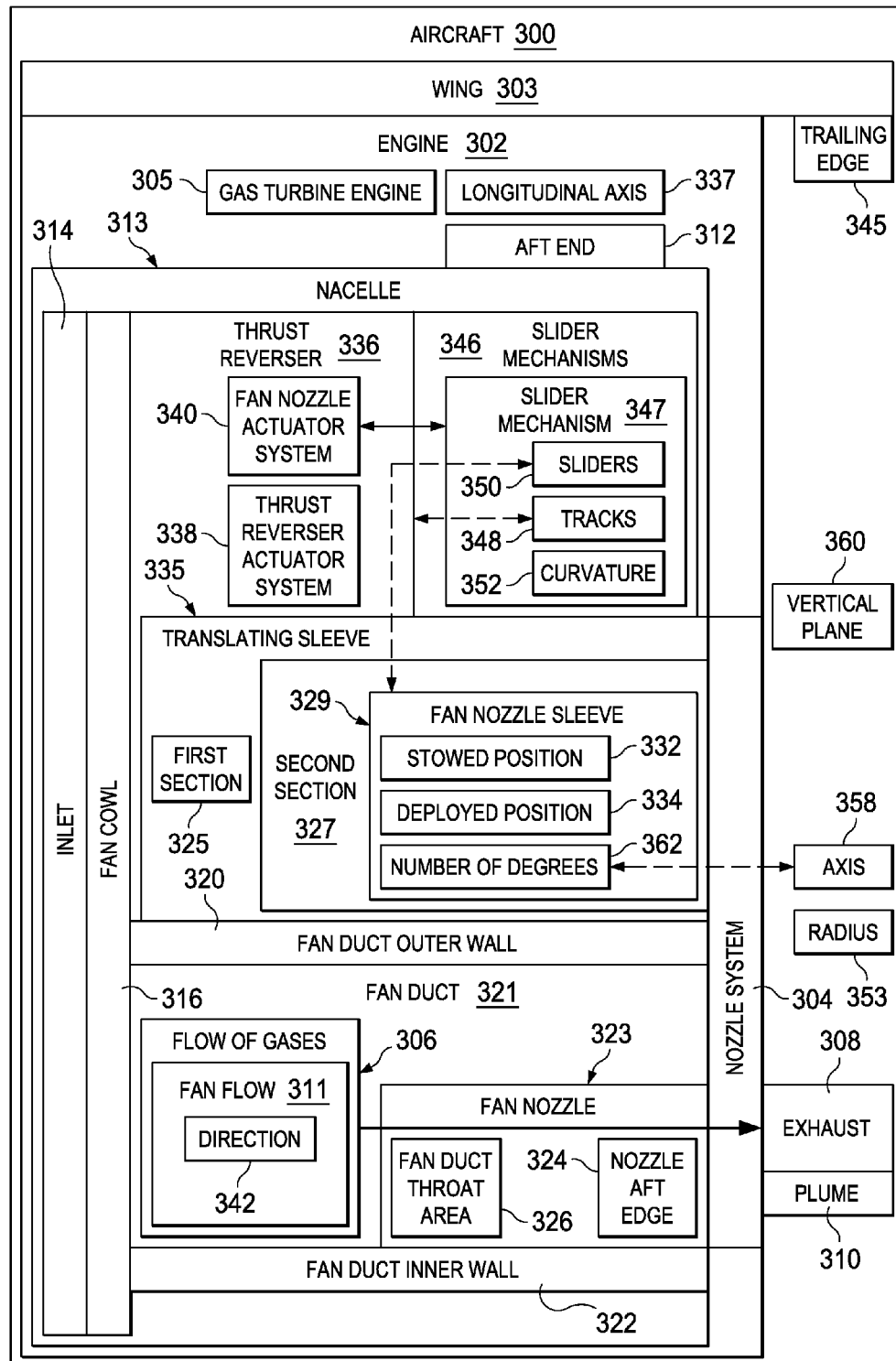
FIG. 3 is an illustration of an engine in an aircraft in accordance with an advantageous embodiment.

Referring now to FIG. 3, an illustration of a block diagram of an engine in an aircraft is depicted in accordance with an advantageous embodiment. In this illustrative example, an aircraft 300 is depicted having an engine 302 connected to a wing 303 of the aircraft 300.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components. In these illustrative examples, the engine 302 may be directly or indirectly connected to the wing 303.

The engine 302, in these depicted examples, is a gas turbine engine 305, which is a type of jet engine. One example of the gas turbine engine 305 is a high bypass turbofan gas turbine engine. The gas turbine engine 305 has a nozzle system 304. The nozzle system 304 is a variable area nozzle system in these illustrative examples.

Operation of the engine 302 generates a flow of gases 306 in the form of exhaust 308 or a plume 310. The portion of the exhaust 308 that exits an aft end 312 of the engine 302 through the nozzle system 304 is referred to as a fan flow 311. In these examples, the fan flow 311 comprises cold gases, as compared to hot gases, that may flow out of the engine 302 through a different nozzle system.

The nozzle system 304 is at least partially housed within a nacelle 313, or housing, of the engine 302. The nacelle 313 of the engine 302 has an inlet 314 at the forwardmost end of the engine 302, a thrust reverser 336 at the aftmost end of the engine 302, and a fan cowl 316 located between the inlet 314 and the thrust reverser 336. In these illustrative examples, gas turbine engines having thrust reverser capability have the thrust reverser 336. The fan cowl 316 houses rotating fan blades (not shown).

The inner surface of the thrust reverser 336 forms a fan duct outer wall 320 for a fan duct 321 for the engine 302. The fan duct outer wall 320, along with a fan duct inner wall 322, forms the boundaries for the fan duct 321. The fan flow 311 flows through the fan duct 321 from the forward portion of the engine 302 and exits a fan nozzle 323 of the nozzle system 304 at an aft end 312 of the engine 302.

In these illustrative examples, the fan nozzle 323 is the portion of the fan duct 321 at the aft end 312 of the engine 302 that has a smaller diameter, as compared to other portions of the fan duct 321. The fan nozzle 323 is an area in the fan duct 321 bounded by the fan duct outer wall 320 and the fan duct inner wall 322. When the fan flow 311 flows through the fan nozzle 323, the speed of the fan flow 311 increases. The fan nozzle 323 is also referred to as the fan duct throat.

The fan nozzle 323 is at the aft end 312 of the engine 302. In particular, the fan nozzle 323 is formed by an aft portion of the fan duct outer wall 320. The fan nozzle 323 is the narrowest part of the fan duct 321 through which the fan flow 311 flows. The fan flow 311 moving through the fan duct 321 moves faster when the fan flow 311 reaches the fan nozzle 323. The fan flow 311 in the fan duct 321 that exits through the fan nozzle 323 contributes to the propulsive thrust generated by the engine 302.

In these illustrative examples, the thrust reverser 336 comprises a translating sleeve 335. The translating sleeve 335 forms a forward portion of the fan duct outer wall 320. The translating sleeve 335 has a first section 325 and a second section 327 connected to the first section 325. The first section 325 and the second section 327 may each have two parts connected together.

The first section 325 of the translating sleeve 335 forms a forward portion of the translating sleeve 335. The second section 327 of the translating sleeve 335 forms an aft portion of the translating sleeve 335. The second section 327 of the translating sleeve 335 is also referred to as a fan nozzle sleeve 329. The fan nozzle 323 is located at an aft end of the fan nozzle sleeve 329. The aft end of the fan nozzle sleeve 329 is the aft end 312 of the engine 302.

An aft edge of the fan nozzle sleeve 329, or a nozzle aft edge 324, and the fan duct inner wall 322 define a fan duct throat area 326. The fan duct throat area 326 is measured at the fan nozzle 323. The fan duct throat area 326 is configured to change when the fan nozzle sleeve 329 moves. By increasing the fan duct throat area 326, the velocity of the fan flow 311 passing through the fan duct 321 decreases. This decrease in velocity reduces the level of exhaust noise generated by the engine 302. This type of fan nozzle sleeve 329 may be used with any engine 302 in which it is desirable to increase the fan duct throat area 326 to an optimal size for a given engine operating condition.

The fan nozzle sleeve 329 may be moved between a stowed position 332 and a deployed position 334. The stowed position 332 is also referred to as an undeployed position. Depending on the implementation, the fan nozzle sleeve 329 may be moved to the deployed position 334 in which the fan duct throat area 326 is increased. The fan duct throat area 326 may be increased to a maximum in the deployed position 334. A maximum value for the fan duct throat area 326 may be desirable for high thrust settings for the engine 302, such as during takeoff and climb-out, where exhaust noise reduction is desirable.

Additionally, the fan nozzle sleeve 329 may be moved to the stowed position 332 in which the fan duct throat area 326 is at a minimum or placed into an optimal position for lower engine thrust settings, such as during cruise flight, where noise reduction is not required. Of course, the fan nozzle sleeve 329 may be moved to any of a plurality of intermediate positions between the stowed position 332 and the deployed position 334, depending on the operating parameters for the engine 302.

Further, a thrust reverser actuator system 338 comprising any number of thrust reverser actuators is configured to move the translating sleeve 335 in an aft direction, or aftwards. In particular, activation of the thrust reverser actuator system 338 moves the first section 325 of the translating sleeve 335 aftwards, which, in turn, moves the fan nozzle sleeve 329 connected to the first section 325 of the translating sleeve 335 aftwards.

This movement in the aft direction includes movement of the translating sleeve 335 axially aftward and radially outward. Axial movement of the translating sleeve 335 is in a direction along a longitudinal axis 337. The longitudinal axis 337 is an axis through the center of the engine 302 that runs aftwards and forwards. Radial movement of the translating sleeve 335 is movement away from or towards the longitudinal axis 337. For example, when moving radially outward and axially aftwards, the translating sleeve 335 moves away from the longitudinal axis 337 and in an aft direction along the longitudinal axis 337.

Of course, activation of the thrust reverser actuator system 338 may also move the translating sleeve 335 forwards, towards the inlet 314 of the engine 302, depending on the type of movement desired.

In one embodiment, the thrust reverser actuator system 338 may be co-located with a fan nozzle actuator system 340. The fan nozzle actuator system 340, which may comprise any number of fan nozzle actuators, is configured to move the fan nozzle sleeve 329 axially in an aft direction and radially outward.

Further, the fan nozzle actuator system 340 is also configured to move the fan nozzle 323 to change a direction 342 of the fan flow 311 that exits the fan nozzle 323. More specifically, the fan nozzle actuator system 340 is configured to rotate the fan nozzle sleeve 329 around an axis 358 by some number of degrees. This rotation may redirect the fan flow 311 exiting the fan nozzle 323 away from a trailing edge 345 of the wing 303. Further, this rotation may be performed during, for example, takeoff, climb-out, descent, and/or other phases of flight. The change in the direction 342 of the fan flow 311 exiting the fan nozzle 323 reduces the level of noise generated during these phases of flight.

The fan nozzle actuator system 340 is configured to move the fan nozzle sleeve 329 axially, radially, and rotate the fan nozzle sleeve 329 using slider mechanisms 346. The slider mechanisms 346 connect the fan nozzle sleeve 329 to the translating sleeve 335. More specifically, the slider mechanisms 346 slidably connect the fan nozzle sleeve 329 to the translating sleeve 335.

As an example of one of the slider mechanisms 346, a slider mechanism 347 comprises any number of tracks 348 and sliders 350. The tracks 348 are connected to the translating sleeve 335, while the sliders 350 are connected to the fan nozzle sleeve 329. One or more tracks 348 function as guides for one or more sliders 350. In other words, one or more tracks 348 are configured to allow movement of one or more sliders 350 along the tracks 348 and hold the sliders 350 within the tracks 348.

As one illustrative example, the slider mechanism 347 may include one slider that is configured to move within a corresponding track. In another example, the slider mechanism 347 may have one slider configured to move within two or more tracks. In still another example, the slider mechanism 347 may have two sliders connected to each other and configured to move through one or more tracks.

In these illustrative examples, the slider mechanisms 346 have a curvature 352. This curvature 352 is selected based on the range of degrees of rotation needed for the fan nozzle sleeve 329. For example, the tracks 348 and the sliders 350 for a slider mechanism 347 have substantially the same curvature 352.

For a particular slider mechanism 347, movement of the sliders 350 having the curvature 352 within the tracks 348 having substantially the same curvature 352 causes any object connected to the sliders 350 to be moved along substantially the same curvature 352. The curvature 352 is selected based on a radius 353 measured from the axis 358 about which the fan nozzle sleeve 329 rotates to the corresponding one or more sliders 350 and one or more tracks 348 for the slider mechanism 347.

The fan nozzle actuator system 340 activates the slider mechanism 347 to cause the sliders 350 to move within their corresponding tracks 348. The fan nozzle actuator system 340 activates the other slider mechanisms 346 in a similar manner. Activation of the slider mechanisms 346 causes the fan nozzle sleeve 329 to move axially, radially, and rotate about the axis 358. In particular, the fan nozzle sleeve 329 may move axially aftwards along the longitudinal axis 337, radially outward away from the longitudinal axis 337, and rotate about the axis 358.

The axis 358 is skewed from a direction substantially perpendicular to a vertical plane 360 through the longitudinal axis 337 for the engine 302. The fan nozzle sleeve 329 may rotate any number of degrees 362 around this axis 358.

The illustration of the aircraft 300 with the engine 302 having the nozzle system 304 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative embodiments, the aircraft 300 may have a second nozzle system in addition to the nozzle system 304. In other illustrative examples, the slider mechanisms 346 may comprise components in addition to and/or in place of the sliders 350 and/or the tracks 348. For example, the tracks 348 may be associated with rollers and/or wheels in the slider mechanisms 346. Of course, in the different illustrative examples, any number of the slider mechanisms 346 may be connected to the fan nozzle sleeve 329.

Figure 4:
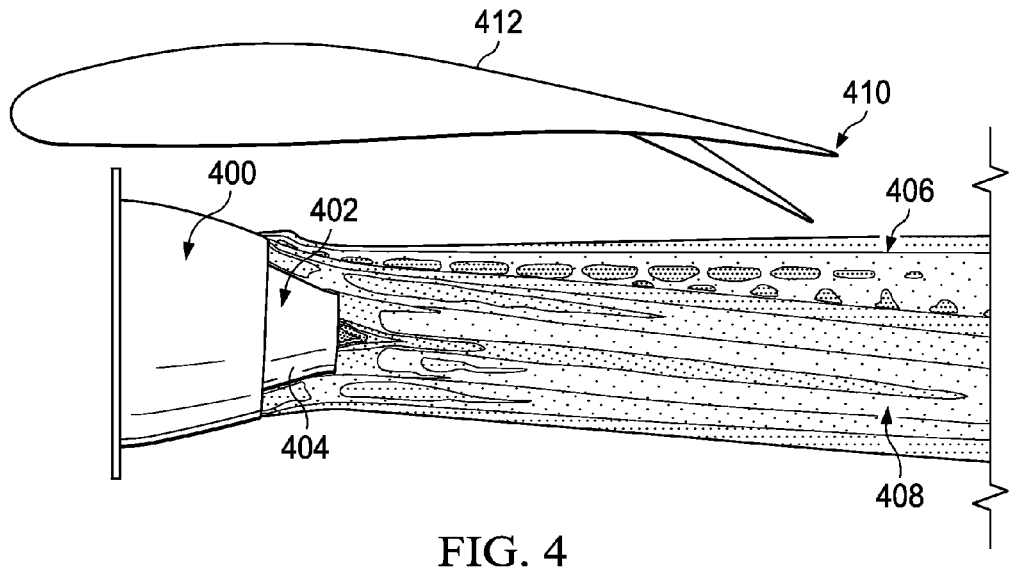
FIG. 4 is an illustration of an engine in accordance with an advantageous embodiment.

With reference now to FIG. 4, an illustration of an engine is depicted in accordance with an advantageous embodiment. In this illustrative example, an engine 400 is associated with a nozzle system 402. The nozzle system 402 may be implemented using the nozzle system 304 in FIG. 3.

The nozzle system 402 comprises a fan nozzle sleeve 404. The fan nozzle sleeve 404 may be configured to move between a stowed position and a deployed position. The fan nozzle sleeve 404 may be in a stowed position during a cruise phase of flight. The fan nozzle sleeve 404 may be in a deployed position during takeoff, climb-out, descent, and/or landing phases of flight.

When the fan nozzle sleeve 404 is in a stowed position, the engine 400 has a plume 406. When the fan nozzle sleeve 404 is in a deployed position, the engine 400 has a plume 408. The plume 408 for the deployed position is directed away from a trailing edge 410 of a wing 412, as compared to the plume 406 for the stowed position.

Referring now to FIG. 5, an illustration of a perspective view of a high bypass turbofan gas turbine engine mounted on an aircraft is depicted in accordance with an advantageous embodiment. In this illustrative example, a high bypass turbofan gas turbine engine 500 is an example of one implementation for the engine 302 in FIG. 3. As depicted, the high bypass turbofan gas turbine engine 500 incorporates a variable area nozzle system 502. The variable area nozzle system 502 may be implemented using the nozzle system 304 in FIG. 3.

In a broad sense, the variable area nozzle system 502 includes a fan nozzle sleeve 504. The fan nozzle sleeve 504 is configured to move radially outward simultaneous with axial movement thereof. More specifically, the fan nozzle sleeve 504 is configured to move radially outward during axially aft translation and radially inward during axially forward translation between a stowed position 506 and a deployed position 508.

In these illustrative examples, the high bypass turbofan gas turbine engine 500 is supported by a pylori or a strut 510. The strut 510 may be mounted to an aircraft, such as the aircraft 300 in FIG. 3, for example. The high bypass turbofan gas turbine engine 500 may mix pressurized air with fuel for generating combustion gases. The combustion gases flow through turbine stages and are expelled at a primary exhaust nozzle 512.

As depicted, the primary exhaust nozzle 512 includes a primary exhaust plug 514 at an aft end of the high bypass turbofan gas turbine engine 500. A large portion of the propulsive thrust generated by the high bypass turbofan gas turbine engine 500 is a result of the pressurized air passing through a fan duct 516 and exiting the fan nozzle 504, which is illustrated with chevrons 518.

The high bypass turbofan gas turbine engine 500 includes a nacelle 520 having an inlet 522 at the forward-most end of the high bypass turbofan gas turbine engine 500. The high bypass turbofan gas turbine engine 500 further includes a fan cowl 524, which houses rotating fan blades (not shown). The fan cowl 524 forms part of a cowl assembly 528.

In these examples, the high bypass turbofan gas turbine engine 500 includes a thrust reverser 530. The thrust reverser 530 is configured to move the translating sleeve 528 axially and radially aftwards. Movement of the translating sleeve 528 may be actuated by a set of thrust reverser actuators 532.

Figure 6:
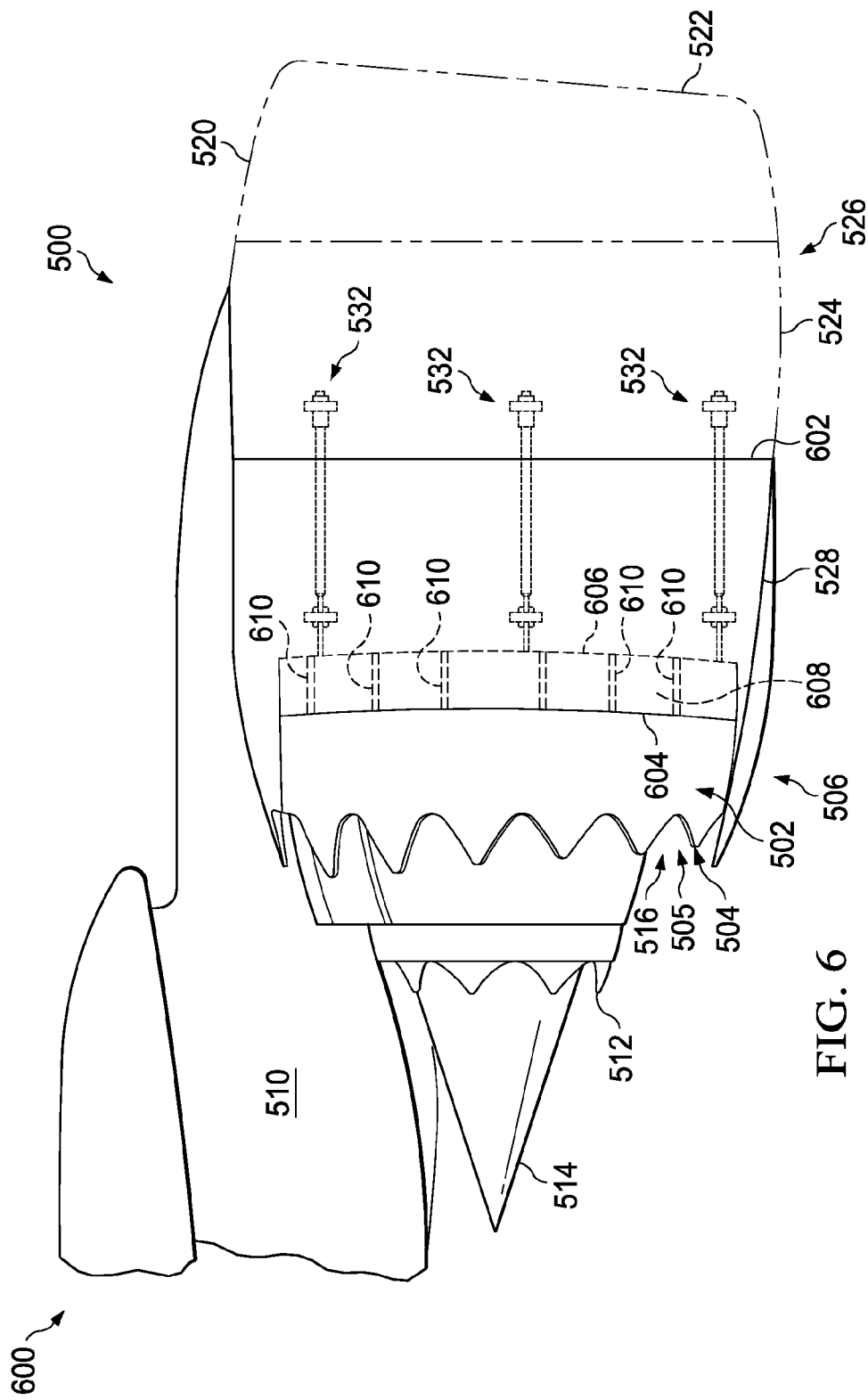
FIG. 6 is an illustration of a side view of a high bypass turbofan gas turbine engine in accordance with an advantageous embodiment.

With reference now to FIG. 6, an illustration of a side view of the high bypass turbofan gas turbine engine in FIG. 5 is depicted in accordance with an advantageous embodiment. In this illustrative example, the high bypass turbofan gas turbine engine 500 is seen from a side view 600.

As depicted, the fan nozzle sleeve 504 is in the stowed position 506. The fan nozzle sleeve 504 is defined by the aft portion of the translating sleeve 528. The translating sleeve 528 includes a translating sleeve forward edge 602. The translating sleeve forward edge 602 is disposed adjacent to the fan cowl 524. The translating sleeve 528 also includes a translating sleeve aft edge 604. The translating sleeve aft edge 604 is disposed in a slightly overlapping relationship with a fan nozzle sleeve forward edge 606. The fan nozzle sleeve forward edge 606 is extendable through an annular slot that may be formed in the translating sleeve 528.

The fan nozzle sleeve forward edge 606 may be formed as a flange, which may be angled slightly inwardly from the exterior contour of the nacelle 520 defined by the fan nozzle sleeve 504. On an interior side of the fan nozzle sleeve 504 is a fan nozzle lip 608. The fan nozzle lip 608 may be configured to form a continuation of the outer wall of the fan duct 516. The continuation formed may provide continuity of flow through the fan duct 516.

In this illustrative example, the high bypass turbofan gas turbine engine 500 includes a set of slider mechanisms 610. The set of slider mechanisms 610 slidably connect the fan nozzle sleeve 504 to the translating sleeve 528.

In one advantageous embodiment, the set of slider mechanisms 610 is positioned in an angularly-spaced relation to one another. The set of slider mechanisms 610 is preferably sized and configured to react to the relatively large internal pressure forces acting against the fan cowl 524 and which are directed generally radially outward. In one illustrative example, the set of slider mechanisms 610 may be adapted to accommodate about three or four Pascals of pressure acting against the fan nozzle 504.

While the set of slider mechanisms 610 are illustrated as being disposed in an angularly-spaced relation along the fan nozzle sleeve forward edge 606, the set of slider mechanisms 610 may be disposed at any location capable of resisting the loads imposed on the fan nozzle 504.

Figure 7:
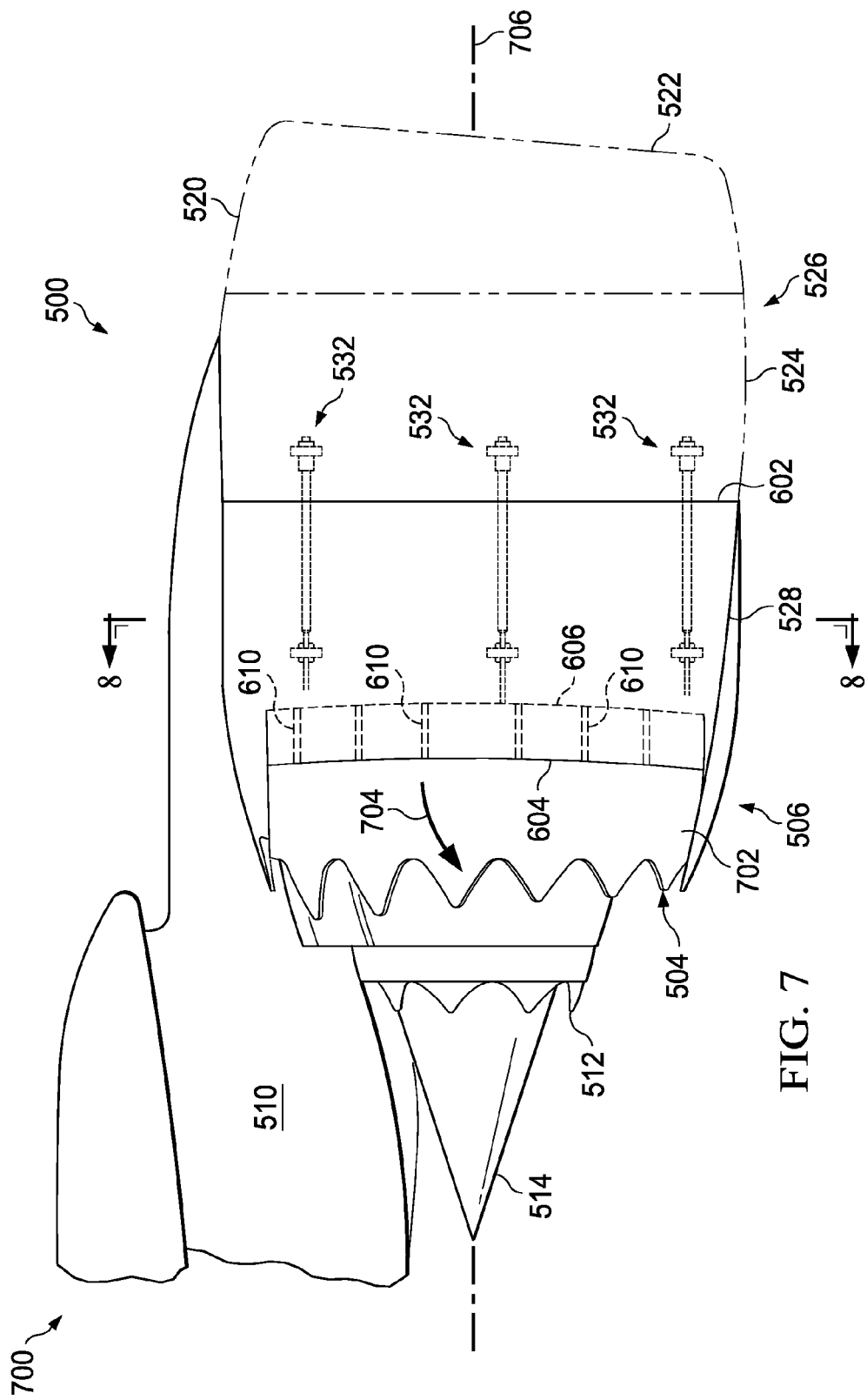
FIG. 7 is an illustration of a side view of a high bypass turbofan gas turbine engine illustrating a fan nozzle moved outwardly and aftwardly into a deployed position in accordance with an advantageous embodiment.

With reference now to FIG. 7, an illustration of a side view of the high bypass turbofan gas turbine engine in FIG. 5 illustrating a fan nozzle moved outwardly and aftwardly into a deployed position is depicted in accordance with an advantageous embodiment. As depicted, the high bypass turbofan gas turbine engine 500 is seen from a side view 700.

In this illustrative example, the fan nozzle sleeve 504 is in a deployed position 702. In the deployed position 702, the translating sleeve aft edge 604 and the fan nozzle sleeve forward edge 606 are disposed in relatively closely-spaced relationship to one another, as compared to the stowed position 506 in FIG. 5.

The fan nozzle sleeve 504 may be moved axially aftwards and radially outwards with respect to a longitudinal axis 706 of the high bypass turbofan gas turbine engine 500. Further, the fan nozzle sleeve 504 may be rotated between the stowed position 506 in FIG. 5 and the deployed position 702.

Figure 8:
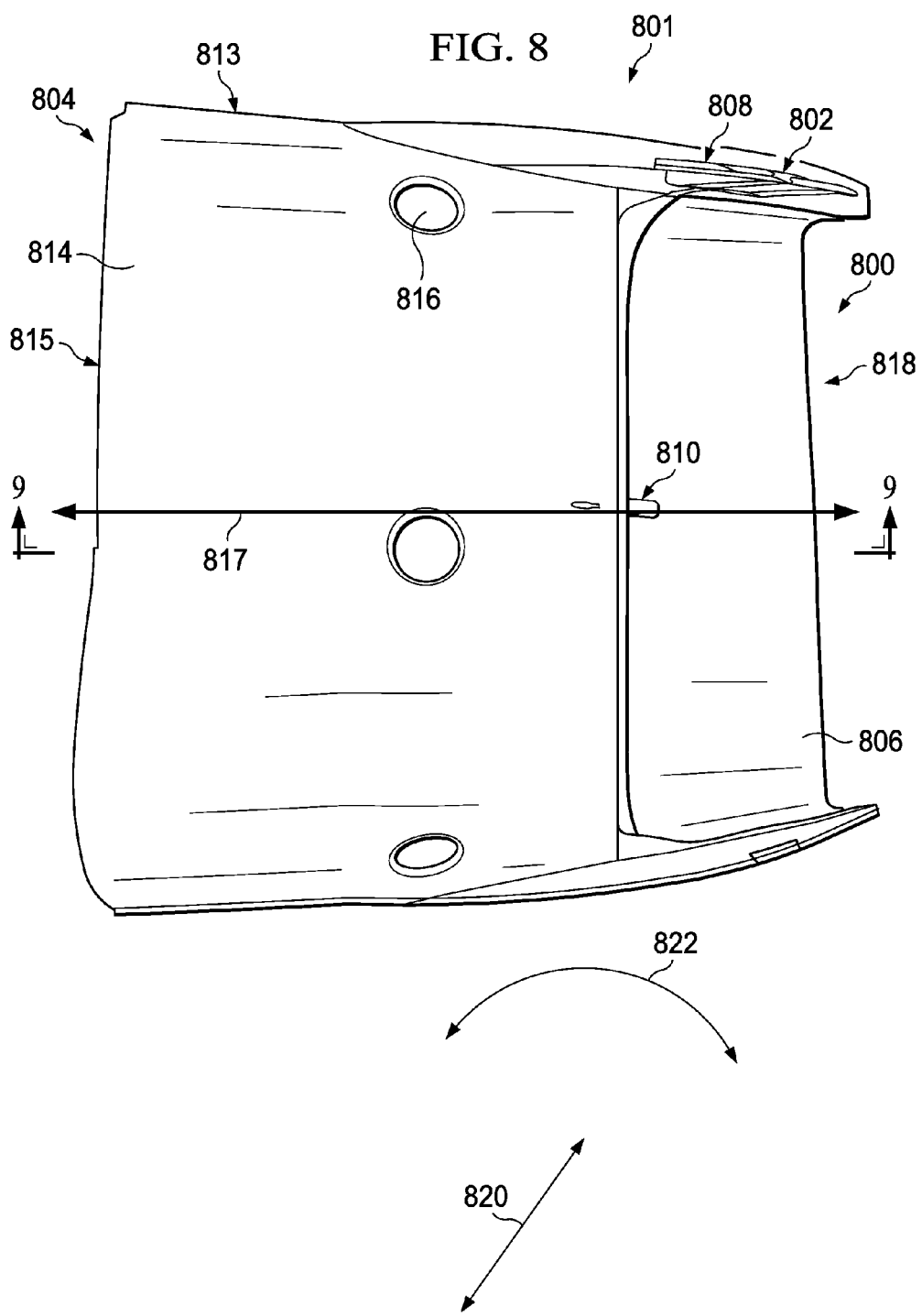
FIG. 8 is an illustration of a nozzle system for an engine in accordance with an advantageous embodiment.

With reference now to FIG. 8, an illustration of a nozzle system for an engine is depicted in accordance with an advantageous embodiment. In this illustrative example, a nozzle system 800 for an engine 801 is depicted as an example of one implementation for the nozzle system 304 in FIG. 3. Only a portion of the nacelle for the engine 801 is depicted in this example. The engine 801 has a nacelle 803 that includes a thrust reverser 815.

As depicted, the thrust reverser 815 is formed by an outer panel 814 and an inner panel 816. The inner panel 816 of the thrust reverser 815 forms a translating sleeve 813 for the thrust reverser 815. The translating sleeve 813 defines a boundary for a fan duct (not shown in this view) in the engine 801.

The translating sleeve 813 includes a fan nozzle sleeve 806 that is part of the nozzle system 800. The fan nozzle sleeve 806 is connected to slider mechanisms 802. The slider mechanisms 802 include tracks 808 and sliders 810. The tracks 808 are connected to the translating sleeve 813 for the thrust reverser 815. The sliders 810 are connected to the fan nozzle sleeve 806. A fan nozzle actuator system (not shown in this view) is configured to move the sliders 810 along the tracks 808 to move the fan nozzle sleeve 806. The fan nozzle sleeve 806 extends aftwardly from the translating sleeve 813.

As illustrated in FIG. 8, the fan nozzle sleeve 806 is in a stowed position 818. The fan nozzle sleeve 806 may be configured to move out of the stowed position 818 by moving radially and axially in the direction of a longitudinal axis 817 through the engine 801 and rotating about an axis 820 in the direction of an arrow 822. The axis 820 about which the fan nozzle sleeve 806 rotates is skewed from a direction that is substantially perpendicular to a vertical plane (not shown) through the longitudinal axis 817.

Figure 9:
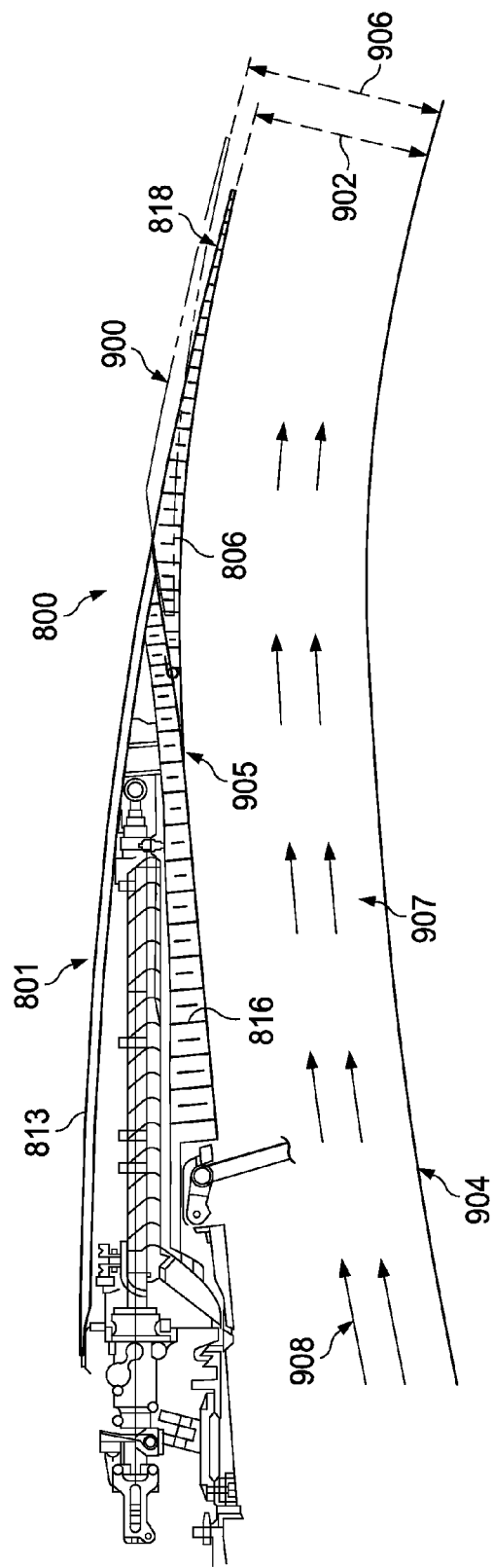
FIG. 9 is an illustration of a cross-sectional view of an upper portion of an engine in accordance with an advantageous embodiment.

Referring now to FIG. 9, an illustration of a cross-sectional view of an upper portion of an engine is depicted in accordance with an advantageous embodiment. In this illustrative example, the engine 801 from FIG. 8 is depicted taken along lines 9-9 in FIG. 8.

The flow of gases generated by the engine 801 is referred to as a fan flow 908. The fan flow 908 flows through a fan duct 907 of the engine 801 and exits the fan nozzle sleeve 806. A fan duct inner wall 904 and a fan duct outer wall 905 form the boundaries for the fan duct 907 of the engine 801. As illustrated, the fan duct outer wall 905 is formed by the translating sleeve 813 and the fan nozzle sleeve 806.

The fan nozzle sleeve 806 may be configured to move between the stowed position 818 and a deployed position 900. In the stowed position 818, the fan nozzle sleeve 806 has a first distance 902 between the fan duct outer wall 905 and the fan duct inner wall 904. In the deployed position 900, the fan nozzle sleeve 806 has a second distance 906 between the fan duct outer wall 905 and the fan duct inner wall 904. The second distance 906 is greater than the first distance 902 in this illustrative example.

Figure 10:
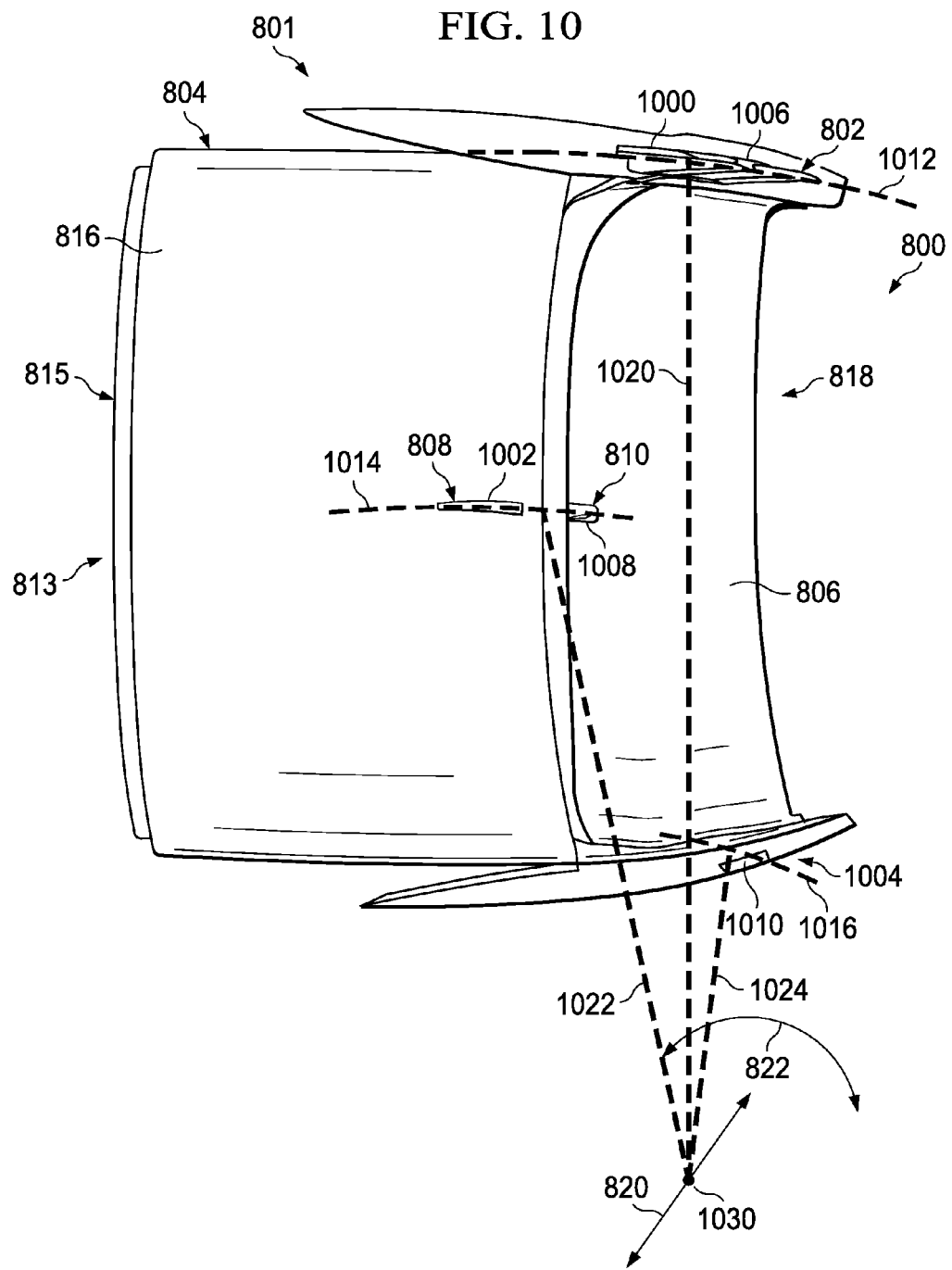
FIG. 10 is an illustration of a nozzle system for an engine in accordance with an advantageous embodiment.

With reference now to FIG. 10, an illustration of a nozzle system for an engine is depicted in accordance with an advantageous embodiment. In this illustrative example, the nozzle system 800 from FIG. 8 is depicted with the outer panel 814 of the thrust reverser 815 removed to provide a clearer view of the slider mechanisms 802. In this depicted example, the fan nozzle sleeve 806 is in the stowed position 818.

As depicted, the tracks 808 include a track 1000, a track 1002, and a group of tracks 1004. Further, sliders 810 include a slider 1006, a slider 1008, and a slider 1010. In this illustrative example, the slider 1006 is configured to move along the track 1000. The slider 1008 is configured to move along the track 1002. The slider 1010 is configured to move along the group of tracks 1004. In this depicted example, the slider 1006 and the track 1000 have a curvature 1012. The slider 1008 and the track 1002 have a curvature 1014. Further, the slider 1010 and the group of tracks 1004 have a curvature 1016.

As illustrated, the curvature 1012 is determined by a radius 1020. The radius 1020 is the distance from the slider 1006 and the track 1000 to a center point of rotation 1030 on the axis 820. The curvature 1014 is determined by a radius 1022, which is the distance from the slider 1008 and the track 1002 to the center point of rotation 1030 on the axis 820.

Further, the curvature 1016 is determined by a radius 1024, which is the distance from the slider 1010 and the group of tracks 1004 to the center point of rotation 1030 on the axis 820. The sliders 810 move within the tracks 808 along the curvatures 1014 to rotate the fan nozzle sleeve 806 around the axis 820 a number of degrees.

In these illustrative examples, the center point of rotation 1030 on the axis 820 is selected to allow rotation of the fan nozzle sleeve 806 in a desirable manner. As one illustrative example, the center point of rotation 1030 may be selected to allow the fan nozzle sleeve 806 to rotate about the axis 820 by about 2.5 degrees when the slider mechanisms 802 are activated.

Figure 11:
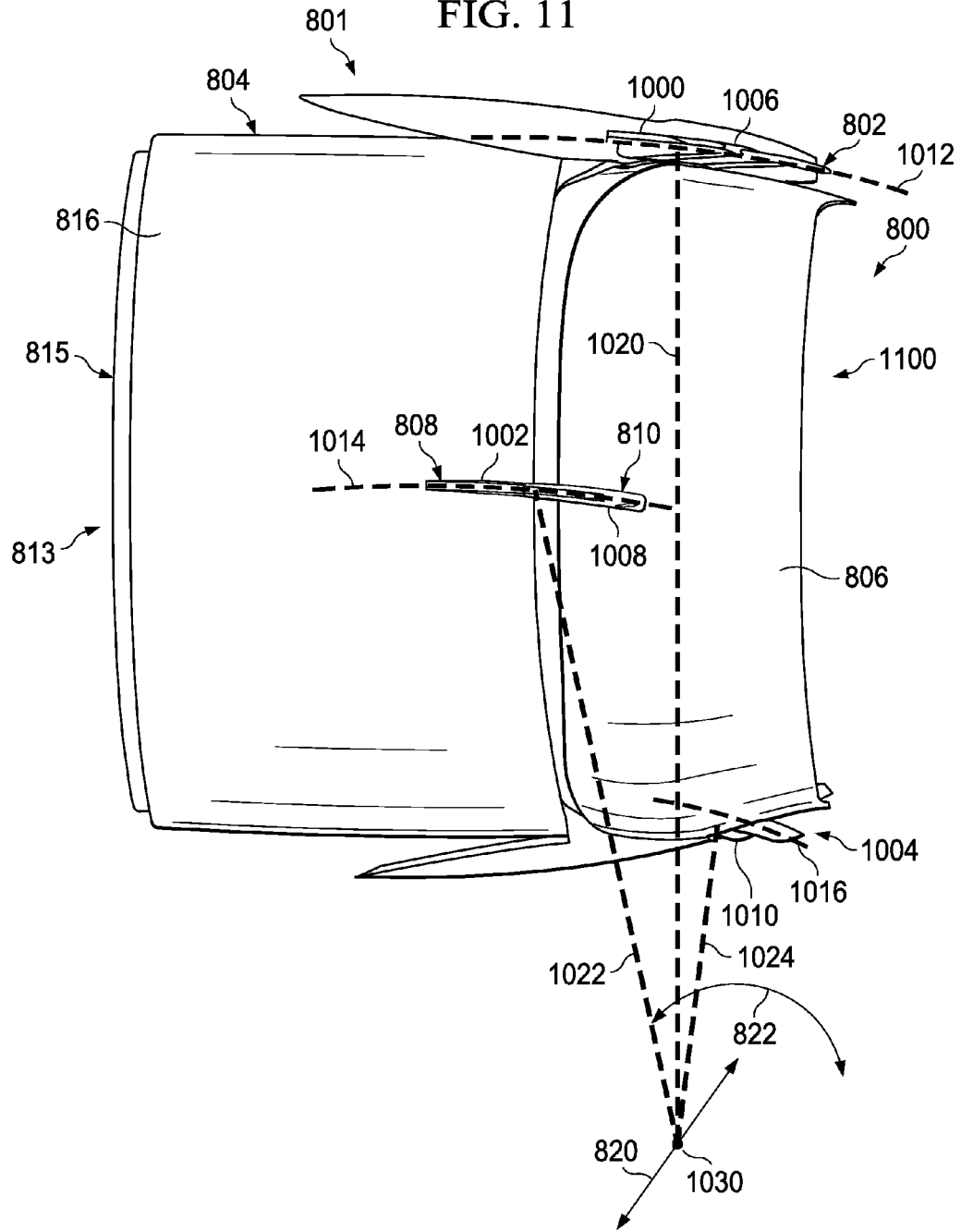
FIG. 11 is an illustration of a nozzle system for an engine in accordance with an advantageous embodiment.

Turning now to FIG. 11, an illustration of a nozzle system for an engine is depicted in accordance with an advantageous embodiment. In this illustrative example, the fan nozzle sleeve 806 is in a deployed position 1100. In particular, the fan nozzle sleeve 806 has moved from the stowed position 818 in FIG. 8 and in FIG. 10 to the deployed position 1100.

Figure 12:
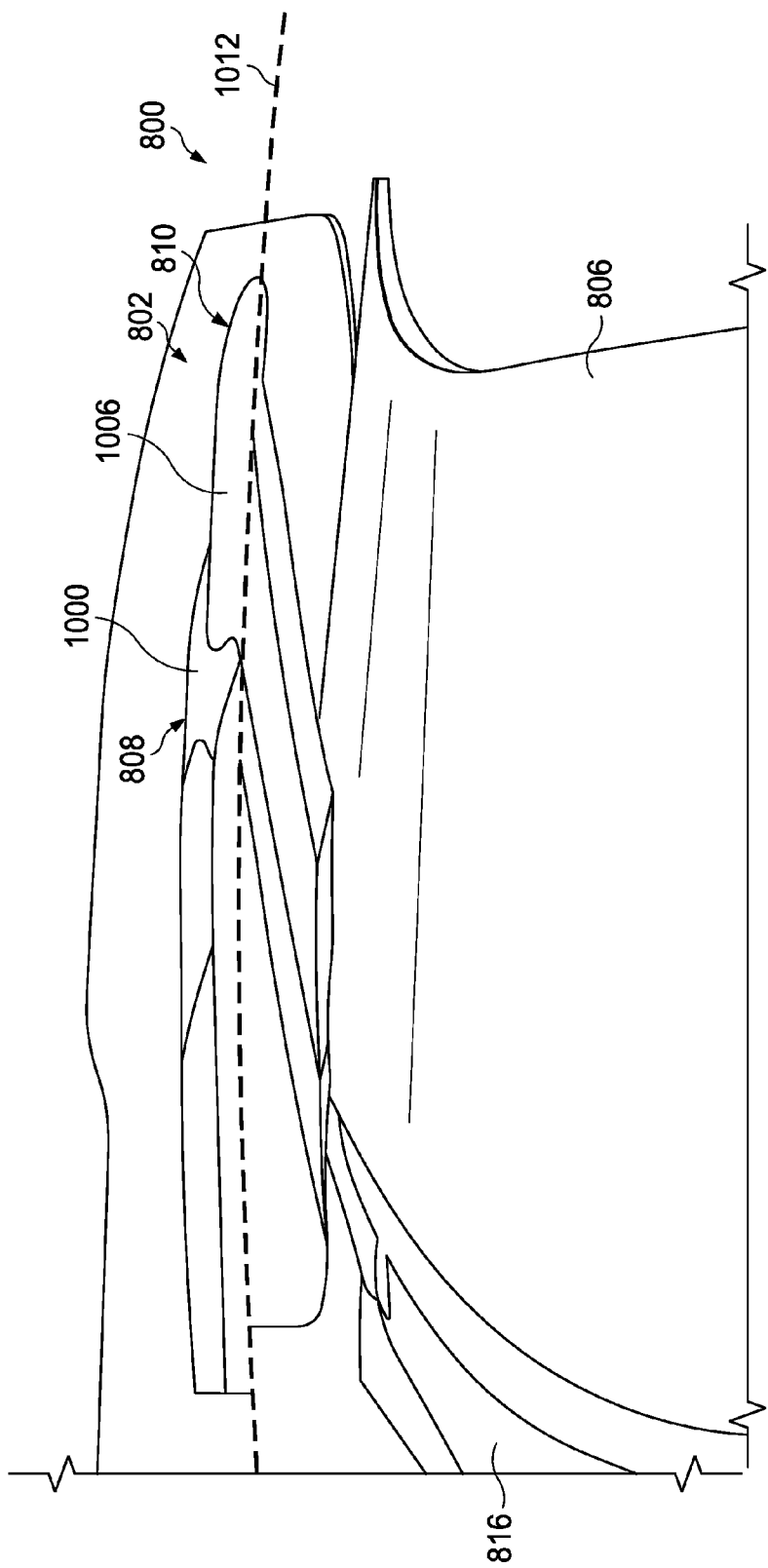
FIG. 12 is an illustration of an enlarged view of a portion of a nozzle system in accordance with an advantageous embodiment.

With reference now to FIG. 12, an illustration of an enlarged view of a portion of a nozzle system is depicted in accordance with an advantageous embodiment. In this illustrative example, an enlarged view of the slider 1006 and the track 1000 is depicted. The slider 1006 is configured to move along the track 1000 along the curvature 1012.

Figure 13:
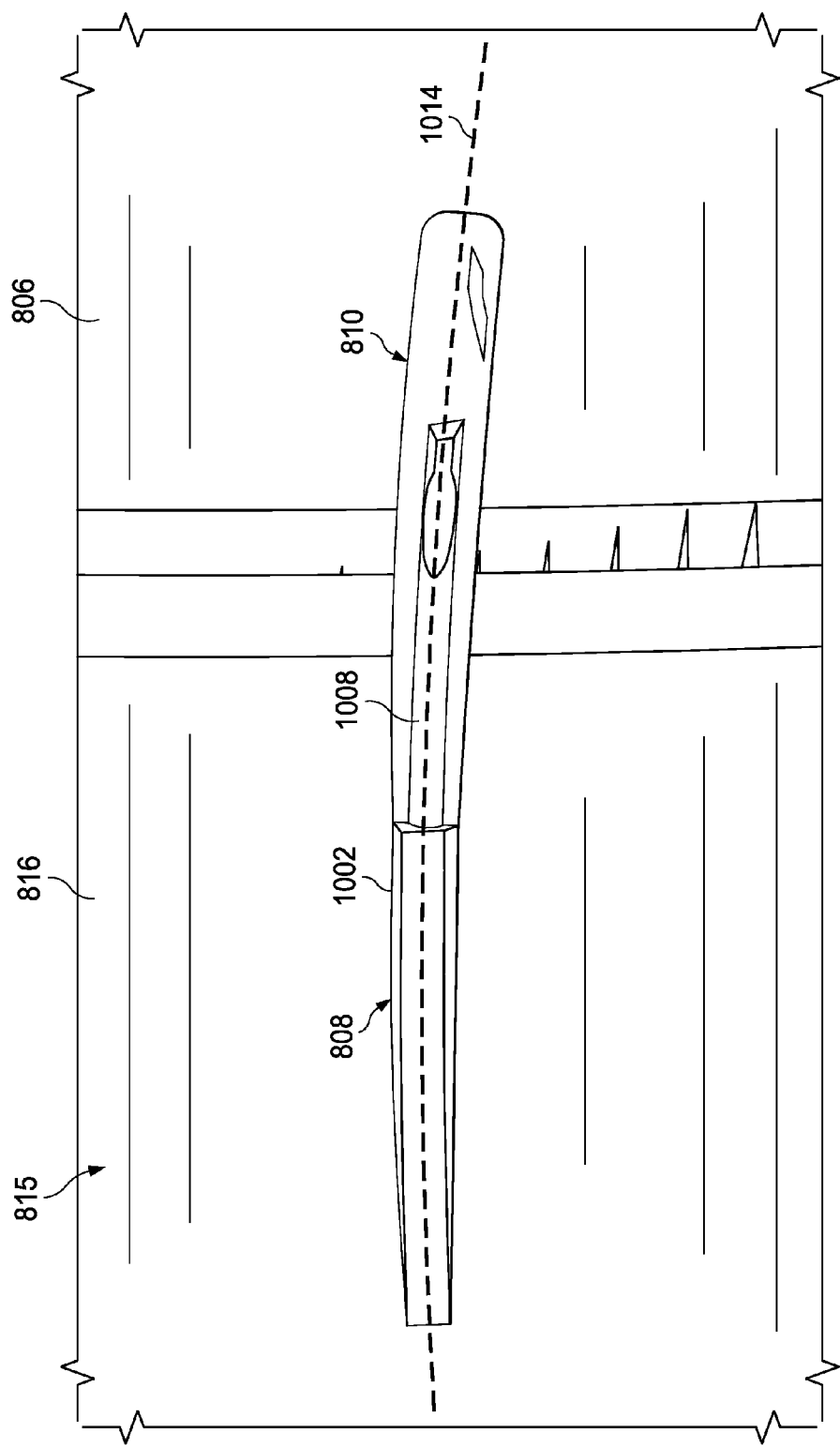
FIG. 13 is an illustration of an enlarged view of a portion of a nozzle system in accordance with an advantageous embodiment.

With reference now to FIG. 13, an illustration of an enlarged view of a portion of a nozzle system is depicted in accordance with an advantageous embodiment. In this illustrative example, an enlarged view of the slider 1008 and the track 1002 is depicted. The slider 1008 is configured to move along the track 1002 along the curvature 1014.

Figure 14:
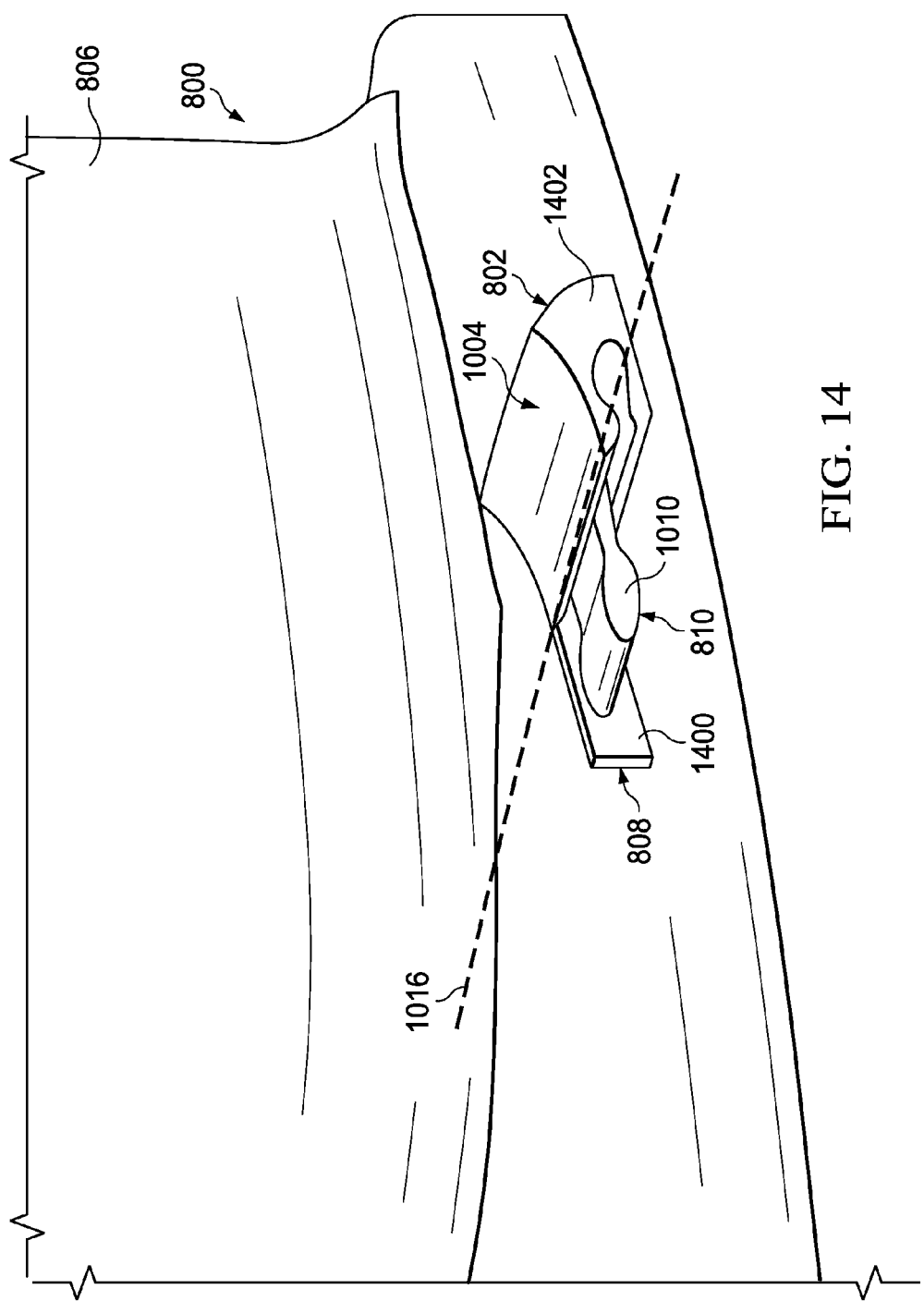
FIG. 14 is an illustration of an enlarged view of a portion of a nozzle system in accordance with an advantageous embodiment.

With reference now to FIG. 14, an illustration of an enlarged view of a portion of a nozzle system is depicted in accordance with an advantageous embodiment. In this illustrative example, an enlarged view of the slider 1010 and the group of tracks 1004 is depicted. As depicted, the group of tracks 1004 includes a track 1400 and a track 1402. The slider 1010 is configured to move along the track 1400 and the track 1402 along the curvature 1016.

Figure 15:
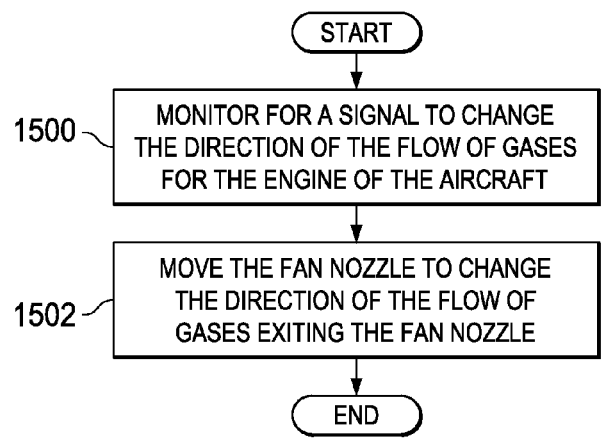
FIG. 15 is an illustration of a flowchart of a process for changing a direction of a flow of gases for an engine in an aircraft in accordance with an advantageous embodiment.

With reference now to FIG. 15, an illustration of a flowchart of a process for changing a direction of a flow of gases for an engine in an aircraft is depicted in accordance with an advantageous embodiment. The process may be implemented using the nozzle system 304 for the engine 302 for aircraft 300 in FIG. 3.

The process begins by monitoring for a signal to change the direction of the flow of gases for the engine of the aircraft (operation 1500). The flow of gases, or the fan flow, is directed by a fan nozzle. The flow of gases is through a fan duct and exits the fan nozzle at an aft end of the engine.

The process then moves the fan nozzle to change the direction of the flow of gases exiting the fan nozzle (operation 1502), with the process terminating thereafter. Movement of the variable area fan nozzle sleeve includes a radial/axial movement of the fan nozzle and rotation of the fan nozzle. The fan nozzle may be rotated away from the aft end of the engine and the trailing edge of the wing of the aircraft to reduce noise during takeoff, climb-out, and/or landing phases of flight. The variable area fan nozzle sleeve may be rotated towards the forward end of the engine when noise reduction is not required, such as during a cruise phase of flight.

Operation 1502 may be performed using a fan nozzle actuator system configured to activate a plurality of slider mechanisms connecting the fan nozzle to a fan cowl of the engine.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a method and apparatus for managing a direction of a flow of gases for an engine of an aircraft. In one advantageous embodiment, an apparatus comprises a fan nozzle, a plurality of slider mechanisms, and a fan nozzle actuator system. A flow of gases generated by an engine moves through the engine and exits an aft end of the engine through the fan nozzle. The plurality of slider mechanisms is configured to connect the variable area fan nozzle sleeve to a thrust reverser sleeve of a nacelle for the engine. The fan nozzle actuator system is configured to activate the plurality of slider mechanisms to move the variable area fan nozzle radially axially and rotate the fan nozzle to change a direction of the flow of gases exiting the fan nozzle.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages, as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a fan nozzle sleeve, wherein a flow of gases generated by an engine moves through the engine and exits the engine at an aft end of the fan nozzle sleeve;
   a plurality of slider mechanisms configured to connect the fan nozzle sleeve to a translating sleeve for a thrust reverser for the engine; and
   a fan nozzle actuator system configured to activate the plurality of slider mechanisms to move the fan nozzle sleeve in an aft direction and rotate the fan nozzle sleeve to change a direction of the flow of gases exiting the fan nozzle sleeve, and wherein moving the fan nozzle sleeve in the aft direction moves the fan nozzle sleeve axially along a longitudinal axis through a center of the engine and radially away from the longitudinal axis through the center of the engine.

2. The apparatus of claim 1, wherein the fan nozzle actuator system is further configured to move the fan nozzle sleeve in the aft direction away from a trailing edge of a wing with which the engine is associated.

3. The apparatus of claim 1, wherein the fan nozzle sleeve is part of a nozzle system for the engine and wherein a slider mechanism in the plurality of slider mechanisms comprises:
   a number of tracks having a curvature; and
   a number of sliders having the curvature and configured to move within the number of tracks.

4. The apparatus of claim 3, wherein the number of tracks are connected to the translating sleeve of a nacelle for the engine and the number of sliders are connected to the fan nozzle sleeve.

5. The apparatus of claim 4, wherein movement of the number of sliders within the number of tracks moves the fan nozzle sleeve in the aft direction and rotates the fan nozzle sleeve about an axis.

6. The apparatus of claim 5, wherein the axis is skewed from a direction substantially perpendicular to a vertical plane through the longitudinal axis through a center of the engine in which the longitudinal axis extends towards a forward end of the engine and an aft end of the engine.

7. The apparatus of claim 3, wherein the fan nozzle sleeve extends in the aft direction from the translating sleeve for the thrust reverser and wherein translation of the translating sleeve for the thrust reverser moves the fan nozzle sleeve axially in the aft direction and radially outwards.

8. The apparatus of claim 1, wherein the fan nozzle actuator system is configured to rotate the fan nozzle sleeve by a number of degrees about an axis and wherein a slider mechanism in the plurality of slider mechanisms comprises:
   a number of tracks having a curvature; and
   a number of sliders having the curvature and being configured to move along the number of tracks along the curvature, wherein the curvature is selected using a radius measured from the axis to the number of sliders.

9. The apparatus of claim 1, wherein the engine is a gas turbine engine in an aircraft and the fan nozzle actuator system and the fan nozzle sleeve are part of a variable area nozzle system.

10. The apparatus of claim 1, wherein the fan nozzle sleeve is configured to move between a stowed position and a deployed position, wherein movement of the fan nozzle sleeve from the stowed position to the deployed position causes the fan nozzle sleeve to move in the aft direction and rotate away from a trailing edge of a wing of an aircraft in which the engine is connected to the wing of the aircraft.

11. The apparatus of claim 10, wherein a fan nozzle duct throat area for the fan nozzle sleeve is increased when the fan nozzle sleeve is in the deployed position.

12. The apparatus of claim 1, wherein moving the fan nozzle sleeve in the aft direction while rotating the fan nozzle sleeve reduces a level of noise generated by the flow of gases exiting the engine.

* * * * *